United States Patent [19]

Cielker

[11] Patent Number: 4,736,978
[45] Date of Patent: Apr. 12, 1988

[54] COUPLING DEVICE FOR INSERTING CABLES INTO CABLE-PROTECTING PIPES

[75] Inventor: Werner Cielker, Cologne, Fed. Rep. of Germany

[73] Assignee: Katimex-Cielker GmbH, Fed. Rep. of Germany

[21] Appl. No.: 848,225

[22] Filed: Apr. 4, 1986

[51] Int. Cl.$^4$ .............................................. H02G 1/08
[52] U.S. Cl. .............................. 294/90; 254/134.3 FT; 254/134.7; 294/1.1; 294/97
[58] Field of Search ............ 294/1.1, 66.1, 82.1, 294/82.32, 86.1, 86.24, 86.25, 86.4, 90, 95, 97; 254/134.3 R, 134.3 FT, 134.7; 15/104.3 G, 104.3 SN

[56] References Cited

U.S. PATENT DOCUMENTS

| | | | |
|---|---|---|---|
| 721,713 | 3/1903 | Lyle | 294/1.1 X |
| 938,723 | 11/1909 | Swan | 254/134.3 FT X |
| 1,077,784 | 11/1913 | Asbury et al. | 294/97 X |
| 1,130,775 | 3/1915 | Toffey | 294/97 X |
| 2,142,290 | 1/1939 | Slocum | 254/134.7 X |
| 2,231,919 | 2/1941 | Kent | 294/90 X |
| 3,041,089 | 6/1962 | Purves | 294/97 X |
| 3,108,835 | 10/1963 | Rowekamp | 294/90 X |
| 3,330,533 | 7/1967 | Blume | 254/134.3 FT |
| 3,445,133 | 5/1969 | Reischl | 294/97 X |

FOREIGN PATENT DOCUMENTS

| | | |
|---|---|---|
| 1307314 | 9/1961 | France . |
| 2248633 | 10/1973 | France . |

*Primary Examiner*—Johnny D. Cherry
*Attorney, Agent, or Firm*—Diller, Ramik & Wight

[57] ABSTRACT

A coupling device including a male coupling member and a female coupling member, the male coupling member including a shank-like body having three longitudinal slots each receiving a pivot fin, a circular spring normally biasing a first end portion of each fin into each associated slot and thereby automatically placing a second end portion of each fin in its normal coupling position, the female coupling member including a fitting connected by spacer bars to a coupler ring which receives the shank-like body, the ring having an opening which causes the fins to deflect toward an unclamped position during insertion, and after insertion the second end portions of the fins are brought into clamping engagement with the ring by the biasing force of the circular spring.

8 Claims, 2 Drawing Sheets

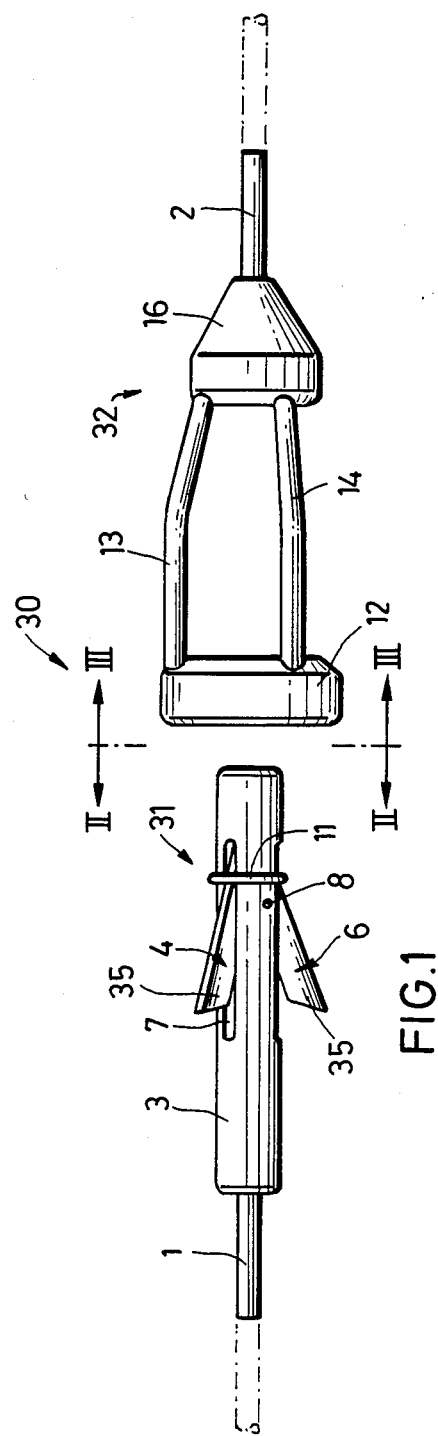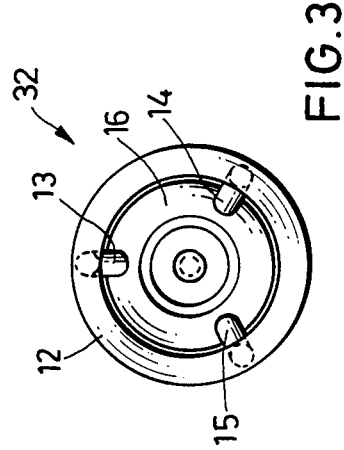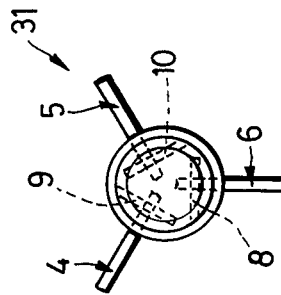

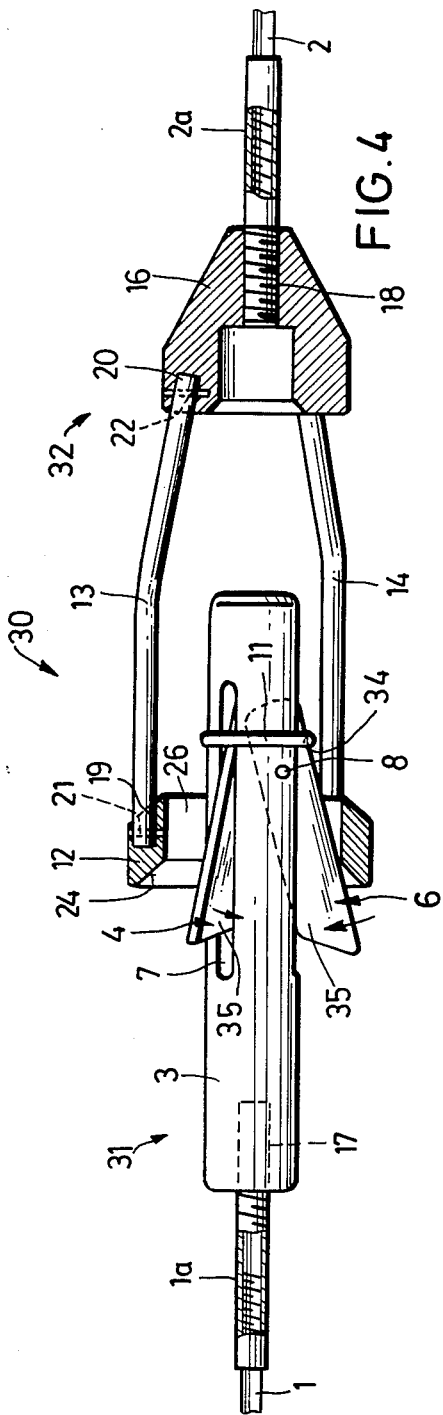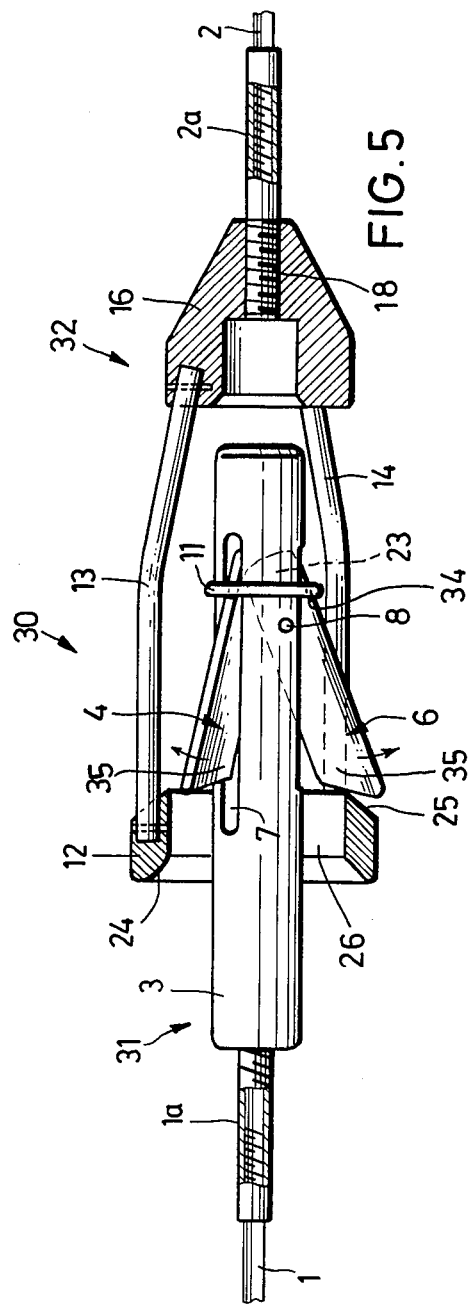

COUPLING DEVICE FOR INSERTING CABLES INTO CABLE-PROTECTING PIPES

BACKGROUND OF THE INVENTION

This invention is directed to a novel coupling device for use with a pair of flexible rods for inserting cables into cable-protecting pipes.

It is known methodolgy when inserting cables into cable-protecting pipes to first push an elastic fiberglass rod from one location of the cable-protecting pipe, as for instance from a cable shaft to another desired site. Thereupon the cable to be inserted is fastened to the end of the elastic fiberglass rod which together with the hooked-up cable is pulled back through the cable protecting pipe, and in this manner the cable is passed through the entire inside of the selected length of the cable-protecting pipe. In this manner cables or similar electrical lines can be inserted into tubular protecting pipes which can be either totally empty or partly filled with cables or electric lines.

The problem with such prior art methodology is that the length through which such cables may be inserted is limited for a variety of reasons. As one example, the friction which is generated when the flexible fiberglass rods are inserted into the cable-protecting pipes must be overcome, and this alone is quite difficult (at times impossible). Even if the flexible/elastic rods are of such design and material as to remain generally straight in their "rest" position, they will still bend when inserted into the cable-protecting pipes, particularly if there are other cables or lines therein. Thus, as the elastic rods bend along the length of the cable-protecting pipes, they bear against the inside surfaces thereof at different points and tend to bind. Absent bending, and with pure rectilinear movement it is possible to insert cables into cable-protecting pipes up to lengths of 200 meters. However, under less optimum circumstances, where the cable-protecting pipes are curved, the length of cable insertion and flexible rod insertion is correspondingly less than the aforementioned 200 meters.

SUMMARY OF THE INVENTION

With the foregoing in mind, it is the primary object of the present invention to provide a novel coupling device, which though relatively simple, can substantially lengthen, as compared to prior known systems, the cables inserted into associated cable-protecting pipes.

The present invention includes a novel coupling device defined by male and female coupling members, one each connected to standard flexible fiberglass rods, and each of the coupling members being inserted from opposite ends of an associated cable-protecting pipe. The male coupling member has a shank-like body carrying a plurality of spring biased fins, while the female coupling member includes a ring for receiving the male coupling member. When the male coupling member is inserted into the ring of the female coupling member, the fins abuttingly engage behind the ring to connect the coupling device together. Thereafter, one of the flexible rods is pulled to draw the other flexible rod the entire length of the cable-protecting pipe. The other rod is now exposed at both ends of the cable-protecting pipe and the latter may be, for example, of a predetermined length of up to approximately 400 meters. At this point the cable which is to be inserted into the cable-protecting pipe is simply connected to either end of the other rod, the opposite end of the other rod is then pulled, and the entire flexible rod is drawn through the cable-protecting pipe thereby drawing cable into the entirety of the cable-protecting pipe.

As an example of the invention, if the cable-protecting pipe is 400 meters long, first and second flexible rods each carrying a coupling member are pushed into opposite left and right open ends of the cable-protecting pipe. If the rods were pushed equidistant they would meet generally at 200 meters or the mid length of the cable-protecting pipe. After automatic coupling, either rod can be then pulled out of the cable-protecting pipe. For example, after the cable is attached to the exposed end of the second rod the first rod could be pulled to draw the second rod toward the left end of the cable-protecting pipe in this particular example. The first rod, the coupling members and the second rod successively emerge at the left end of the cable-protecting pipe until the end of the cable connected to the second rod is exposed at the left end of the cable-protecting pipe. At this point approximately 400 meters of the cable has been drawn through the cable-protecting pipe, and the second rod can simply be disconnected from the cable. In this fashion the maximum length of cables inserted into cable-protecting pipes by past methodology has been virtually doubled. This is quite important because another advantage obtained is that fewer connection sites between series-connected cables/cable-protecting pipes are necessary, and this is a savings in material because of the lesser parts, and a savings in labor because of the lesser time involved in connecting the lesser number of parts together.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a side elevational view of a novel coupling device of this invention, and illustrates ends of flexible rods connected to male and female coupling members in the uncoupled position thereof.

FIG. 2 is an end elevational view taken generally along line II—II of FIG. 1 and illustrates three fins normally biased to their coupling or connecting positions by a circular spring.

FIG. 3 is an end elevational view taken generally along line III—III of FIG. 1 and illustrates a ring of the female coupling member dimensioned to receive the male coupling member.

FIG. 4 is a side elevational view, partially in cross section, and illustrates the male coupling member partially inserted into the female coupling member.

FIG. 5 is a side elevational view, again with parts shown in cross section, and illustrates the coupled or locked position of the coupling members.

DETAILED DESCRIPTION OF THE PREFERRED EMBODIMENT

A novel coupling device constructed in accordance with this invention is generally designated by the reference numeral 30 and includes a male coupling member 31 (FIGS. 1, 2, 4 and 5) and a female coupling member 32 (FIGS. 1, 3, 4 and 5).

The male coupling member 31 includes a generally cylindrical shank-like body 3 which carries three fins 4, 5 and 6 equally circumferentially spaced about the shank-like body 3. Each of the fins 4-6 is at least partially inserted in a longitudinal slot 7 of the shank-like body 3. The fins 4-6 are connected by pivot pins 9, 10 and 8, respectively (FIG. 2), and spring means in the form of a rubber O-ring 11 seated in a slot or recess 34 of each of the fins 4-6 normally biases the fins toward their coupled or locked position. The coupled position of the fins 4-6 is the position at which first or forwardmost end portions 23 of the fins 4-6 are maximally inserted in the slot 7, whereas second end portions 35 of the fins are maximally pivoted outwardly of the slots 7. The latter position is readily achieved because of the relatively small lever arm of the first end portions 23 of the fins 4-6 as compared to the larger lever arms of the second end portions 35. The shank-like body 3 also includes interior threads or a threaded bore 17 (FIG. 4) for receiving a threaded end (unnumbered) of a flexible rod or bar 1.

The female coupling member 32 of the coupling device 30 includes a ring, sleeve or annular member 12 connected by three equally circumferentially spaced rods, bars or spacers 13-15 (FIG. 3) to a connector or fitting 16 having internal threads 18 (FIGS. 4 and 5) for threadedly connecting thereto the threaded end portion (unnumbered) of another flexible/elastic fiberglass rod or bar 2. The ends of the rods 13-15 are inserted into bores 19 or 20 of the ring 12 on the one hand, and of the fitting 16 on the other, and are fastened thereat by cross pins 21, 22, respectively, (see FIGS. 4 and 5). The ring 12 also includes a conical entrance portion or surface 24, and an annular opposite end face 25 between which is a cylindrical opening 26, the diameter of which is less than the largest circle circumscribed by the second end portions 35 of the fins 4-6 in the locked or coupled position thereof.

For purposes of discussing the manner in which the coupling device 30 is utilized, it will be assumed that a cable is to be inserted into a tubular cable-protecting pipe of approximately 400 meters in length having left and right open ends into which will be respectively inserted the male and female coupling members 31, 32 which have connected thereto rods 1, 2, respectively, of approximately 200 meters each. It is also assumed that the cable which is to be inserted into the cable-protecting pipe is connected to the end of the rod 2 remote from (200 m) the coupling member 32.

The male coupling member 31 is inserted into the left-hand open end of the cable-protecting pipe, the female coupling member 32 is inserted into the right-hand open end of the cable-protecting pipe, and both flexible rods 1, 2 are pushed toward each other. Optimally, the coupling members 31, 32 would reach each other at approximately the mid-distance (200 meters) of the total length of the cable-protecting pipe, although this particular distance can vary. However, when the coupling members are in proximity to each other, the conical entrance surface 24 of the ring 12 guides the forwardmost end (unnumbered) of the shank-like body 3 of the male coupling member 31 into the opening 26. During the latter motion, which is left-to-right in FIG. 4, the smaller diameter of the opening 26 progressively deflects the fins 4-6 inwardly, as is indicated by the unnumbered headed arrows associated therewith in FIG. 4, until such time as the end portions 35 pass beyond the annular end face 25 of the ring 12 (FIG. 5). Once the latter occurs, the biasing force of the spring 11 immediately deflects the end portions 35 of the fins 4-6 radially outwardly, as is best exemplified by the lowermost fin 6 in FIG. 5 which brings the same into axially abutting relationship with the ring 12 and the annular end face 25 thereof. This completes the coupling of the coupling device 30 at approximately the mid-distance (200 meters) of the total length of the cable-protecting pipe. Thus, approximately 200 meters of each of the rods 1, 2 are within the cable-protecting pipe.

At this point, in order to pull the cable through the cable-protecting pipe, the rod 1 is pulled to the left, it being remembered that it was earlier assumed that the cable which is to be inserted into the cable-protecting pipe is connected to the end of the rod 2 remote from the coupling member 32. Therefore, as the rod 1 is pulled to the left its approximate 200 meter length is pulled through the cable-protecting pipe which through the coupling 30 progressively pulls the rod 2 to the left until the rod 2 is successively and eventually entirely withdrawn through the left-end of the cable-protecting pipe. In this manner the entire approximate 200 meter length of the rod 2 is also drawn entirely through the cable-protecting pipe and along therewith approximately 400 meters of the cable attached to the rod 2 is drawn through the cable-protecting pipe until its end is exposed at the left end of the cable-protecting pipe. At this point the rod 2 is disengaged from the exposed end of the cable, and the entire length (400 meters) of the cable is entirely within the entire length (400 meters) of the overall cable-protecting pipe.

Obviously, the same method can be performed by attaching the cable to the most remote end of the rod 1 and pulling the rod 2 to the right to draw the cable through the entire approximate 400 meters of the cable-protecting pipe. Once the latter has been completed, the cable is disconnected from the rod 1.

Since the flexible rods 1, 2 are at times made from fiberglass, the threaded ends thereof may be threaded into internally threaded brass sleeves which are also externally threaded. The external threads of the brass sleeve can then be threaded into the interior threads 17, 18 of the respective shank-like body 3 and fitting 16. In such cases the fitting 16 and the shank-like body 3 would be removed from and threaded back upon the exterior thread of the brass sleeve to thus preclude wear and tear on the more fragile threads of the fiberglass rods 1, 2.

Although only a preferred embodiment of the invention has been specifically illustrated and described herein, it is to be understood that minor variations may be made in the apparatus without departing from the spirit and scope of the invention as defined in the appended claims.

I claim:

1. A coupling device comprising a male coupling member adapted to be at least partially inserted into a female coupling member, said male coupling member including a shank-like body, at least three fins carried by said shank-like body, means pivotally connecting said fins for pivotal movement between a first uncoupled position and a second coupled position at which a coupling portion of said fins are respectively adjacent and remote from said shank-like body, spring means for normally urging said fins to said second position, said three fins being generally equally circumferentially spaced from each other about said shank-like body, each fin having opposite first and second end portions, at least three equally circumferentially spaced longitudinally disposed radially outwardly opening slots in said shank-like body, a first end portion of each fin being housed in an associated one of said slots and the second end portion of each fin being disposed outwardly of its associated slot, said spring means normally biases said first end portion of each fin into its associated slot, said spring means being an annular resilient member generally in circumferential relationship to said shank-like body and biasing the first end portion of each fin toward its associated slot, said female coupling member including a ring defining an opening of a size to freely receive said shank-like body yet small enough to move said fins from generally said second position toward generally said first position upon the introduction of said shank-like body into said ring, said ring including surface means for axially abutting each fin second end portion to couple said male and female coupling members together when said fins are in said second coupled position, and means for connecting an end of an individual flexible rod to each of said male and female coupling members.

2. The coupling device as defined in claim 1 including a fitting carrying said female coupling member rod connecting means, and means for supporting said fitting in spaced relationship to said ring.

3. The coupling device as defined in claim 1 including a fitting carrying said female coupling member rod connecting means, and at least one spacer bar supporting said fitting in spaced relationship to said ring.

4. The coupling device as defined in claim 1 including a fitting carrying said female coupling member rod connecting means, and a plurality of circumferentially spaced spacer bars each having an end fit in a bore in said ring and fitting.

5. The coupling device as defined in claim 1 including a fitting carrying said female coupling member rod connecting means, a plurality of circumferentially spaced spacer bars each having an end fit in a bore in said ring and fitting, and a cross-pin connecting each spacer bar end in its associated bore.

6. The coupling device as defined in claim 1 wherein said flexible rod end connecting means are threads.

7. The coupling device as defined in claim 1 including a fitting carrying said female coupling member and rod connecting means, said flexible rod end connecting means being defined by a threaded bore in said shank-like body and said fitting, and an internally and externally threaded sleeve threaded into each threaded bore.

8. The coupling device as defined in claim 1 wherein said spring means surrounds said shank-like body and is seated in recesses of said fin first end portions.

* * * * *